(12) United States Patent
Acharya et al.

(10) Patent No.: US 6,205,812 B1
(45) Date of Patent: Mar. 27, 2001

(54) CRYOGENIC ULTRA COLD HYBRID LIQUEFIER

(75) Inventors: Arun Acharya, East Amherst; John Henri Royal, Grand Island; Christian Fredrich Gottzmann, Clarence; Dante Patrick Bonaquist; Bayram Arman, both of Grand Island, all of NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/453,297

(22) Filed: Dec. 3, 1999

(51) Int. Cl.$^7$ ....................................................... F25J 1/00
(52) U.S. Cl. .................................. 62/607; 62/6; 62/613
(58) Field of Search .............................. 62/606, 607, 613, 62/6

(56) References Cited

U.S. PATENT DOCUMENTS

| | | | |
|---|---|---|---|
| 4,778,497 | 10/1988 | Hanson et al. | 62/11 |
| 5,441,658 | 8/1995 | Boyarsky et al. | 252/67 |
| 5,579,655 | * 12/1996 | Grenier | 62/607 |
| 5,711,156 | 1/1998 | Matsui et al. | 62/6 |
| 5,743,095 | 4/1998 | Gschneidner, Jr. et al. | 62/3.1 |
| 5,799,505 | 9/1998 | Bonaquist et al. | 62/613 |
| 5,836,173 | 11/1998 | Lynch et al. | 62/613 |
| 5,934,078 | 8/1999 | Lawton, Jr. et al. | 62/3.1 |
| 6,076,372 | * 6/2000 | Acharya et al. | 62/613 |

* cited by examiner

*Primary Examiner*—Ronald Capossela
(74) *Attorney, Agent, or Firm*—Stanley Ktorides

(57) ABSTRACT

A system for effectively generating refrigeration for use in putting a product fluid into an ultra cold condition wherein an active magnetic regenerator or a multicomponent refrigerant fluid cycle is integrated with a pulse tube system for receiving heat generated by the pulse tube system.

10 Claims, 2 Drawing Sheets

US 6,205,812 B1

CRYOGENIC ULTRA COLD HYBRID LIQUEFIER

TECHNICAL FIELD

This invention relates generally to refrigeration and, more particularly, to the generation of refrigeration such as to liquefy gases such as hydrogen which require ultra cold temperatures for liquefaction.

BACKGROUND ART

The liquefaction of certain gases such as neon, hydrogen or helium requires the generation of very low temperature refrigeration. For example, at atmospheric pressure neon liquefies at 27.1 K, hydrogen liquefies at 20.39 K, and helium liquefies at 4.21 K. The generation of such very low temperature refrigeration is very expensive. Inasmuch as the use of fluids such as neon, hydrogen and helium are becoming increasingly important in such fields as energy generation, energy transmission, and electronics, any improvement in systems for the liquefaction of such fluids would be very desirable.

Pulse tube refrigeration, wherein refrigeration is generated by a pressure pulse applied to a gas, is used to liquefy fluids such as neon, hydrogen and helium, but such use is effective only at a relatively small scale.

Accordingly, it is an object of this invention to provide an improved system for generating refrigeration sufficient to liquefy hard to liquefy fluids such as neon, hydrogen or helium.

It is another object of this invention to provide a system for liquefying hard to liquefy fluids such as neon, hydrogen or helium which can operate at a relatively high production level.

SUMMARY OF THE INVENTION

The above and other objects, which will become apparent to one skilled in the art upon a reading of this disclosure, are attained by the present invention, one aspect of which is:

Method for producing product fluid in an ultra cold condition comprising:

(A) compressing multicomponent refrigerant fluid, cooling the compressed multicomponent refrigerant fluid to produce cooled multicomponent refrigerant fluid, and expanding the cooled multicomponent refrigerant fluid to at least partially condense the multicomponent refrigerant fluid;

(B) compressing pulse tube gas to produce hot compressed pulse tube gas, cooling the hot compressed pulse tube gas by indirect heat exchange with the at least partially condensed multicomponent refrigerant fluid to produce cooled compressed pulse tube gas and warmed multicomponent refrigerant fluid, and further cooling the cooled compressed pulse tube gas by direct contact with cold heat transfer media to produce cold pulse tube gas and warmed heat transfer media;

(C) expanding cold pulse tube gas to produce ultra cold pulse tube gas and to produce a gas pressure wave which compresses and heats pulse tube working fluid, and cooling the heated pulse tube working fluid by indirect heat exchange with warmed multicomponent refrigerant fluid to produce further warmed multicomponent refrigerant fluid; and (D) passing the ultra cold pulse tube gas in indirect heat exchange with product fluid to produce product fluid in an ultra cold condition, and then passing the resulting pulse tube gas in direct contact with the warmed heat transfer media to produce the said cold heat transfer media.

Another aspect of the invention is:

Apparatus for producing product fluid in an ultra cold condition comprising:

(A) a compressor, a multicomponent refrigerant fluid heat exchanger, means for passing fluid from the compressor to the multicomponent refrigerant fluid heat exchanger, an expansion device, and means for passing fluid from the multicomponent refrigerant fluid heat exchanger to the expansion device;

(B) a regenerator comprising a regenerator heat exchanger and a regenerator body containing heat transfer media, means for generating pressurized gas for oscillating flow within the regenerator, and means for passing fluid from the expansion device to the regenerator heat exchanger;

(C) a pulse tube comprising a pulse tube heat exchanger and a pulse tube body, means for passing fluid from the regenerator heat exchanger to the pulse tube heat exchanger, and means for passing fluid from the pulse tube heat exchanger to the multicomponent refrigerant fluid heat exchanger; and (D) passage means for passing gas between the regenerator body and the pulse tube body, said passage means including a product fluid heat exchanger, means for providing product fluid to the product fluid heat exchanger, and means for withdrawing product fluid from the product fluid heat exchanger in an ultra cold condition.

As used herein the term "multicomponent refrigerant fluid" means a fluid comprising two or more species and capable of generating refrigeration.

As used herein the term "variable load refrigerant" means a mixture of two or more components in proportions such that the liquid phase of those components undergoes a continuous and increasing temperature change between the bubble point and the dew point of the mixture. The bubble point of the mixture is the temperature, at a given pressure, wherein the mixture is all in the liquid phase but addition of heat will initiate formation of a vapor phase in equilibrium with the liquid phase. The dew point of the mixture is the temperature, at a given pressure, wherein the mixture is all in the vapor phase but extraction of heat will initiate formation of a liquid phase in equilibrium with the vapor phase. Hence, the temperature region between the bubble point and the dew point of the mixture is the region wherein both liquid and vapor phases coexist in equilibrium. In the practice of this invention the temperature differences between the bubble point and the dew point for the variable load refrigerant is at least 10° K, preferably at least 20° K and most preferably at least 50° K.

As used herein the term "ultra cold condition" means having a temperature of 90° K or less.

As used herein the term "indirect heat exchange" means the bringing of fluids into heat exchange relation without any physical contact or intermixing of the fluids with each other.

As used herein the term "expansion" means to effect a reduction in pressure.

As used herein the term "atmospheric gas" means one of the following: nitrogen ($N_2$), argon (Ar), krypton (Kr), xenon (Xe), neon (Ne), carbon monoxide (CO), carbon dioxide ($CO_2$), oxygen ($O_2$), deuterium ($D_2$), hydrogen ($H_2$) and helium (He).

DETAILED DESCRIPTION

In general the invention comprises the generation of refrigeration to very cold temperatures using a non-pulse tube system which is preferably either a multicomponent refrigerant fluid refrigeration system or an active magnetic regenerator refrigeration system. The non-pulse tube system is integrated with the pulse tube system in a defined manner whereby heat generated by the pulse tube system is rejected into the non-pulse tube system, enabling the pulse tube system to effectively generate ultra cold refrigeration for bringing a relatively large quantity of product fluid to ultra cold conditions.

Figure 1:
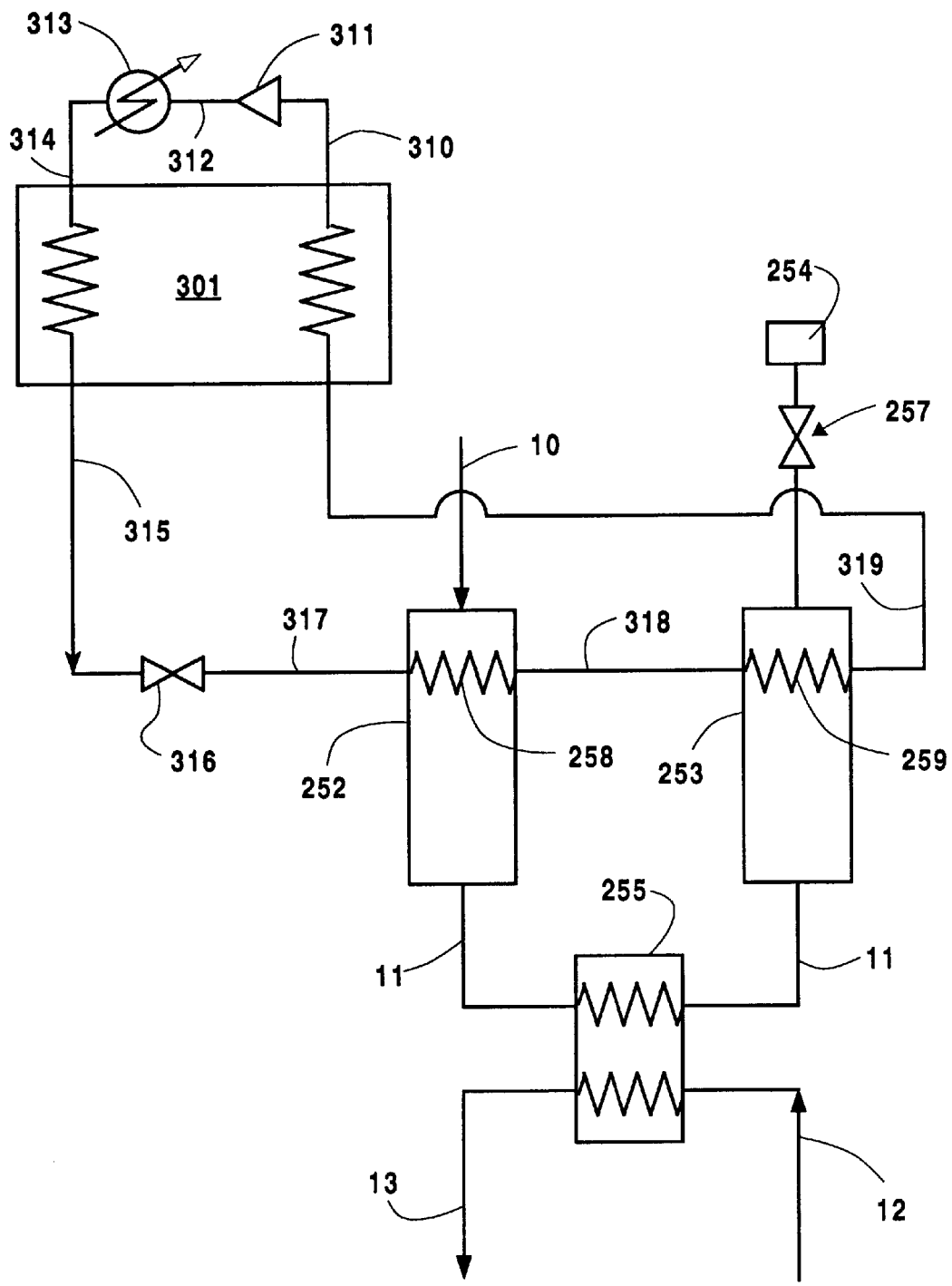
FIG. 1 is a schematic representation of one preferred embodiment of the invention wherein a multicomponent refrigerant fluid refrigeration system is integrated with a pulse tube refrigeration system.

The invention will be described in greater detail with reference to the Drawings. Referring now to FIG. 1, multi-component refrigerant fluid in stream 310 is compressed in compressor 311 to a pressure generally within the range of from 60 to 1000 pounds per square inch absolute (psia). The multicomponent refrigerant fluid useful in the practice of this invention comprises at least one atmospheric gas preferably nitrogen, argon and/or neon, and preferably at least one fluorine containing compound having up to four carbon atoms such as fluorocarbons, hydrofluorocarbons, hydrochlorofluorocarbons and fluoroethers, and/or at least one hydrocarbon having up to three carbon atoms.

Compressed multicomponent refrigerant fluid 312 is then cooled of the heat of compression in cooler 313 by indirect heat exchange with a suitable cooling fluid such as cooling water, and resulting multicomponent refrigerant fluid 314 is passed through multicomponent refrigerant fluid heat exchanger 301 wherein it is cooled by indirect heat exchange with warming multicomponent refrigerant fluid as will be further described below. The cooled multicomponent refrigerant fluid 315 is passed from heat exchanger 301 to expansion device 316, which is preferably an expansion valve, wherein it is throttled to a lower pressure thereby lowering its temperature. The reduction in temperature of the multicomponent refrigerant fluid as a consequence of its expansion in expansion device 316 serves to at least partially condense, and preferably serves to totally condense, the multicomponent refrigerant fluid. This resulting multicomponent refrigerant fluid is then passed in line 317 to regenerator heat exchanger 258 which is located in the hot end of regenerator 252.

Regenerator 252 contains pulse tube gas which may be helium, hydrogen, neon, a mixture of helium and neon, or a mixture of helium and hydrogen. Helium and mixtures of helium and hydrogen are preferred.

A pulse, i.e. a compressive force, is applied to the hot end of regenerator 252 as illustrated in representational form by pulse arrow 10 thereby initiating the first part of the pulse tube sequence. Preferably the pulse is provided by a piston which compresses a reservoir of pulse tube gas in flow communication with regenerator 252. Another preferred means of applying the pulse to the regenerator is by the use of a thermoacoustic driver which applies sound energy to the gas within the regenerator. Yet another way for applying the pulse is by means of a linear motor/compressor arrangement The pulse serves to compress the pulse tube gas producing hot pulse tube gas at the hot end of regenerator 252. The hot pulse tube gas is cooled by indirect heat exchange with the at least partially condensed multicomponent refrigerant fluid in heat exchanger 258 to produce warmed multicomponent refrigerant fluid in stream 318, and to produce cooled compressed pulse tube gas for passage through the remainder of the regenerator, i.e. the regenerator body. Some pulse tubes use double-inlet geometry where some of the pulse gas is also sent into the warm end of the pulse tube.

The regenerator body contains heat transfer media. Examples of suitable heat transfer media in the practice of this invention include steel balls, wire mesh, high density honeycomb structures, expanded metals, and lead balls.

The heat transfer media is at a cold temperature, generally within the range of from 2 K to 250 K, having been brought to this cold temperature in the second part of the pulse tube sequence which will be described more fully below. As the cooled compressed pulse tube gas passes through the regenerator body, it is further cooled by direct contact with the cold heat transfer media to produce warmed heat transfer media and cold pulse tube gas, generally at a temperature within the range of from 4 K to 252 K.

The cold pulse tube gas is passed in line 11 to pulse tube 253 at the cold end. Pulse tube 253 has a pulse tube heat exchanger 259 at the other end, i.e. the hot end, from where the cold pulse tube gas is passed into the pulse tube. As the cold pulse tube gas passes into pulse tube 253 at the cold end it expands, lowering its temperature so as to form ultra cold pulse tube gas, and also generating a gas pressure wave which flows toward the warm end of pulse tube 253 and compresses the gas within the pulse tube, termed the pulse tube working fluid, thereby heating the pulse tube working fluid.

Warmed multicomponent refrigerant fluid in line 318 is passed to pulse tube heat exchanger 259 in the warm end of pulse tube 253. In the practice of this invention the pulse tube body contains only gas for the transfer of the pressure energy from the expanding pulse tube gas at the cold end for the heating of the pulse tube working fluid at the warm end of the pulse tube. That is, pulse tube 253 contains no moving parts such as are used with a piston arrangement. The operation of the pulse tube without moving parts is a significant advantage of this invention. The warmed multicomponent refrigerant fluid is further warmed by indirect heat exchange in pulse tube heat exchanger 259 with the heated pulse tube working fluid to produce further warmed multicomponent refrigerant fluid which is totally in the gaseous state and which is passed from pulse tube heat exchanger 259 in line 319 to multicomponent refrigerant fluid heat exchanger 301. Within multicomponent refrigerant fluid heat exchanger 301, the multicomponent refrigerant fluid is warmed still further by indirect heat exchange with the cooling multicomponent refrigerant fluid brought to heat exchanger 301 in stream 314 as was previously discussed, and resulting still further warmed multicomponent refrigerant fluid is passed from heat exchanger 301 in line 310 to compressor 311 and the multicomponent refrigerant fluid refrigeration cycle starts anew.

Attached to the warm end of pulse tube 253 is a line having orifice 257 leading to reservoir 254. The compression wave of the pulse tube working fluid contacts the warm end wall of the pulse tube and proceeds back in the second part of the pulse tube sequence. Orifice 257 and reservoir 254 are employed to maintain this compression wave in phase so that it does not interfere with the next compression wave generated by expanding cold pulse tube gas in the cold end of pulse tube 253.

The ultra cold pulse tube gas in the cold end of pulse tube 253 passes back through line 11 to regenerator 252. In this return path the ultra cold pulse tube gas passes through product fluid heat exchanger 255 wherein it is warmed by indirect heat exchange with product fluid brought to product fluid heat exchanger 255 in line 12. Among the product fluids which may be cooled, liquefied and/or subcooled in the practice of this invention one can name hydrogen, deuterium, helium, neon, nitrogen, argon and mixtures comprising one or more thereof.

As the product fluid passes through product fluid heat exchanger 255, it is brought to an ultra cold condition by the indirect heat exchange with the ultra cold pulse tube gas. The resulting product fluid, which is in an ultra cold condition and may be in gaseous, liquid or slush form, is withdrawn from product fluid heat exchanger 255 and recovered.

The pulse tube gas emerging from product fluid heat exchanger 255 is passed in line 11 to regenerator 252 wherein it directly contacts the heat transfer media within the regenerator body to produce the aforesaid cold heat transfer media, thereby completing the second part of the pulse tube refrigerant sequence and putting the regenerator into condition for the first part of a subsequent pulse tube refrigeration sequence.

Figure 2:
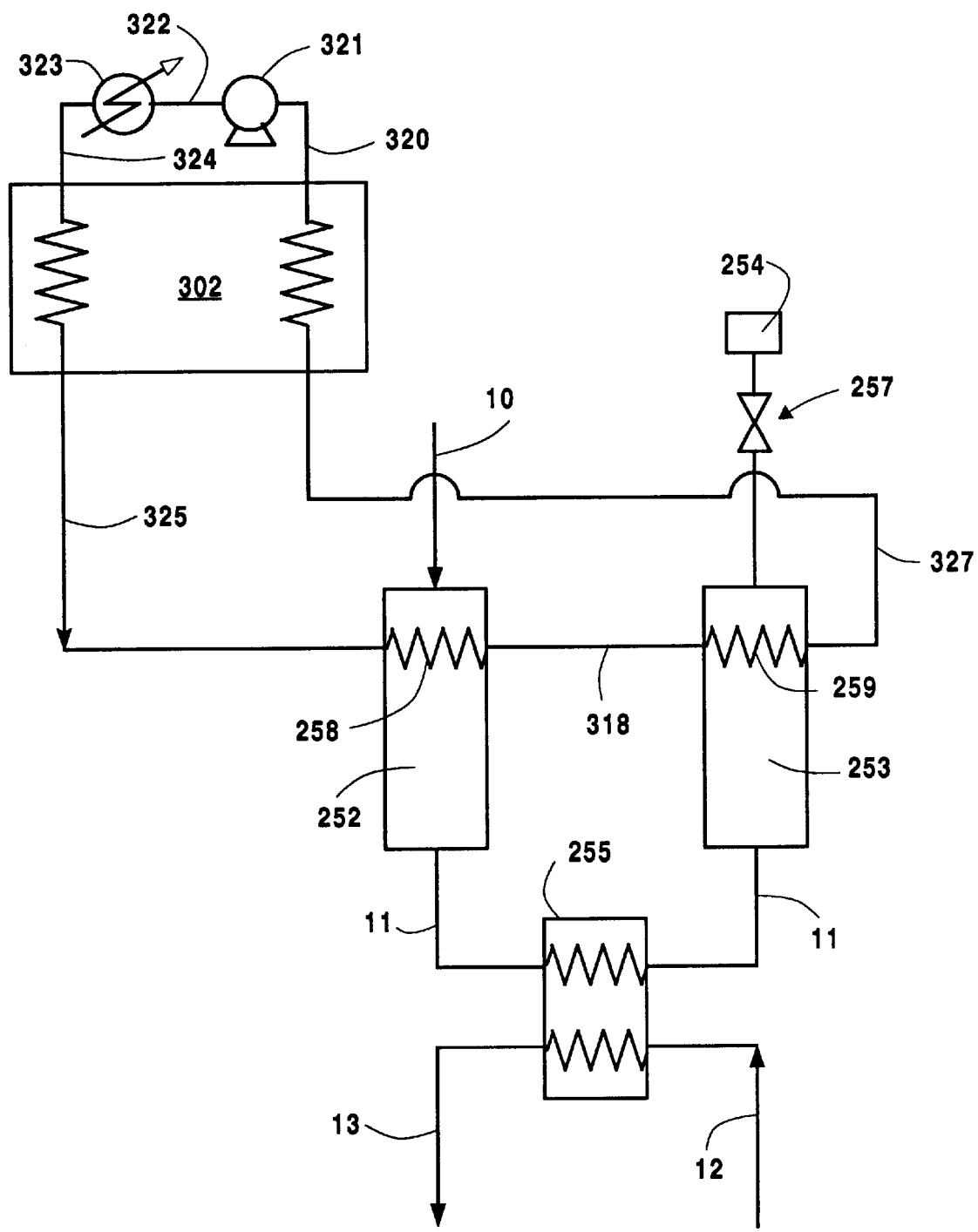
FIG. 2 is a schematic representation of another embodiment of the invention wherein an active magnetic regenerator refrigeration system is integrated with a pulse tube refrigeration system.

FIG. 2 illustrates another embodiment of the invention wherein the heat generated by the pulse tube refrigeration system is rejected into an active magnetic regenerator refrigeration system which is integrated with the pulse tube refrigeration system. The numerals of FIG. 2 are the same as those of FIG. 1 for the common elements and these common elements will not be discussed again in detail.

Referring now to FIG. 2, warm refrigerant fluid in stream 320 is passed through pump 321 and then as stream 322 passed to cooler 323 wherein it is cooled to form cooled refrigerant fluid 324. Active magnetic regenerator 302 comprises bed material which warms upon magnetization and cools upon demagnetization. Regenerator 302 is demagnetized and refrigerant fluid in stream 324 passes through the heat exchanger portion of regenerator 302 in the process being cooled by heat exchanger with the demagnetized bed material. Resulting cooled refrigerant fluid in stream 325 is then warmed and further warmed through the pulse tube system as was previously described, and resulting warmed refrigerant fluid is passed back to active magnetic regenerator 302 which has been magnetized thus warming the refrigerant fluid further. The warm refrigerant fluid emerges from regenerator 302 in stream 320 and the cycle starts anew.

Although the invention has been described in detail with reference to certain preferred embodiments, those skilled in the art will recognize that there are other embodiments of the invention within the spirit and the scope of the claims.

What is claimed is:

1. Method for producing product fluid in an ultra cold condition comprising:
    (A) compressing multicomponent refrigerant fluid, cooling the compressed multicomponent refrigerant fluid to produce cooled multicomponent refrigerant fluid, and expanding the cooled multicomponent refrigerant fluid to at least partially condense the multicomponent refrigerant fluid;
    (B) compressing pulse tube gas to produce hot compressed pulse tube gas, cooling the hot compressed pulse tube gas by indirect heat exchange with the at least partially condensed multicomponent refrigerant fluid to produce cooled compressed pulse tube gas and warmed multicomponent refrigerant fluid, and further cooling the cooled compressed pulse tube gas by direct contact with cold heat transfer media to produce cold pulse tube gas and warmed heat transfer media;
    (C) expanding cold pulse tube gas to produce ultra cold pulse tube gas and to produce a gas pressure wave which compresses and heats pulse tube working fluid, and cooling the heated pulse tube working fluid by indirect heat exchange with warmed multicomponent refrigerant fluid to produce further warmed multicomponent refrigerant fluid; and
    (D) passing the ultra cold pulse tube gas in indirect heat exchange with product fluid to produce product fluid in an ultra cold condition, and then passing the resulting pulse tube gas in direct contact with the warmed heat transfer media to produce the said cold heat transfer media.

2. The method of claim 1 wherein the expanded multicomponent refrigerant fluid is completely condensed.

3. The method of claim 1 wherein the multicomponent refrigerant fluid comprises at least one atmospheric gas.

4. The method of claim 1 wherein the multicomponent refrigerant fluid is a variable load refrigerant.

5. Apparatus for producing product fluid in an ultra cold condition comprising:
    (A) a compressor, a multicomponent refrigerant fluid heat exchanger, means for passing fluid from the compressor to the multicomponent refrigerant fluid heat exchanger, an expansion device, and means for passing fluid from the multicomponent refrigerant fluid heat exchanger to the expansion device;
    (B) a regenerator comprising a regenerator heat exchanger and a regenerator body containing heat transfer media, means for generating pressurized gas for oscillating flow within the regenerator, and means for passing fluid from the expansion device to the regenerator heat exchanger;
    (C) a pulse tube comprising a pulse tube heat exchanger and a pulse tube body, means for passing fluid from the regenerator heat exchanger to the pulse tube heat exchanger, and means for passing fluid from the pulse tube heat exchanger to the multicomponent refrigerant fluid heat exchanger; and
    (D) passage means for passing gas between the regenerator body and the pulse tube body, said passage means including a product fluid heat exchanger, means for providing product fluid to the product fluid heat exchanger, and means for withdrawing product fluid from the product fluid heat exchanger in an ultra cold condition.

6. The apparatus of claim 5 wherein the expansion device is a valve.

7. The apparatus of claim 5 wherein the means for generating pressurized gas for flow within the regenerator comprises a piston.

8. The apparatus of claim 5 wherein the means for generating pressurized gas for flow within the regenerator comprises a thermoacoustic driver.

9. Method for producing product fluid in an ultra cold condition comprising:
    (A) cooling refrigerant fluid to produce cooled refrigerant fluid
    (B) compressing pulse tube gas to produce hot compressed pulse tube gas, cooling the hot compressed pulse tube gas by indirect heat exchange with the cooled refrigerant fluid to produce cooled compressed pulse tube gas and warmed refrigerant fluid, and further cooling the cooled compressed pulse tube gas by direct contact with cold heat transfer media to produce cold pulse tube gas and warmed heat transfer media;

(C) expanding cold pulse tube gas to produce ultra cold pulse tube gas and to produce a gas pressure wave which compresses and heats pulse tube working fluid, and cooling the heated pulse tube working fluid by indirect heat exchange with warmed refrigerant fluid to produce further warmed refrigerant fluid; and (D) passing the ultra cold pulse tube gas in indirect heat exchange with product fluid to produce product fluid in an ultra cold condition, and then passing the resulting pulse tube gas in direct contact with the warmed heat transfer media to produce the said cold heat transfer media.

10. Apparatus for producing product fluid in an ultra cold condition comprising:

(A) a refrigerant fluid heat exchanger and means for passing refrigerant fluid to the refrigerant fluid heat exchanger;

(B) a regenerator comprising a regenerator heat exchanger and a regenerator body containing heat transfer media, means for generating pressurized gas for oscillating flow with the regenerator, and means for passing refrigerant fluid from the refrigerant fluid heat exchanger to the regenerator heat exchanger;

(C) a pulse tube comprising a pulse tube heat exchanger and a pulse tube body, means for passing refrigerant fluid from the regenerator heat exchanger to the pulse tube heat exchanger, and means for passing refrigerant fluid from the pulse tube heat exchanger to the refrigerant fluid heat exchanger; and (D) passage means for passing gas between the regenerator body and the pulse tube body, said passage means including a product fluid heat exchanger, means for providing product fluid to the product fluid heat exchanger, and means for withdrawing product fluid from the product fluid heat exchanger in an ultra cold condition.

\* \* \* \* \*